A. C. KETCHUM.
Car Wheel.

No. 15,339.

Patented July 15, 1856.

UNITED STATES PATENT OFFICE.

A. C. KETCHUM, OF NEW YORK, N. Y.

RAILROAD-CAR WHEEL.

Specification of Letters Patent No. 15,339, dated July 15, 1856.

*To all whom it may concern:*

Be it known that I, A. C. KETCHUM, of the city, county, and State of New York, have invented a new and useful Improvement in Cast-Iron Railroad-Wheels; and I do hereby declare that the following is a full, clear, and exact description of the same, reference being had to the accompanying drawing, forming part of this specification, in which—

Figure 1:
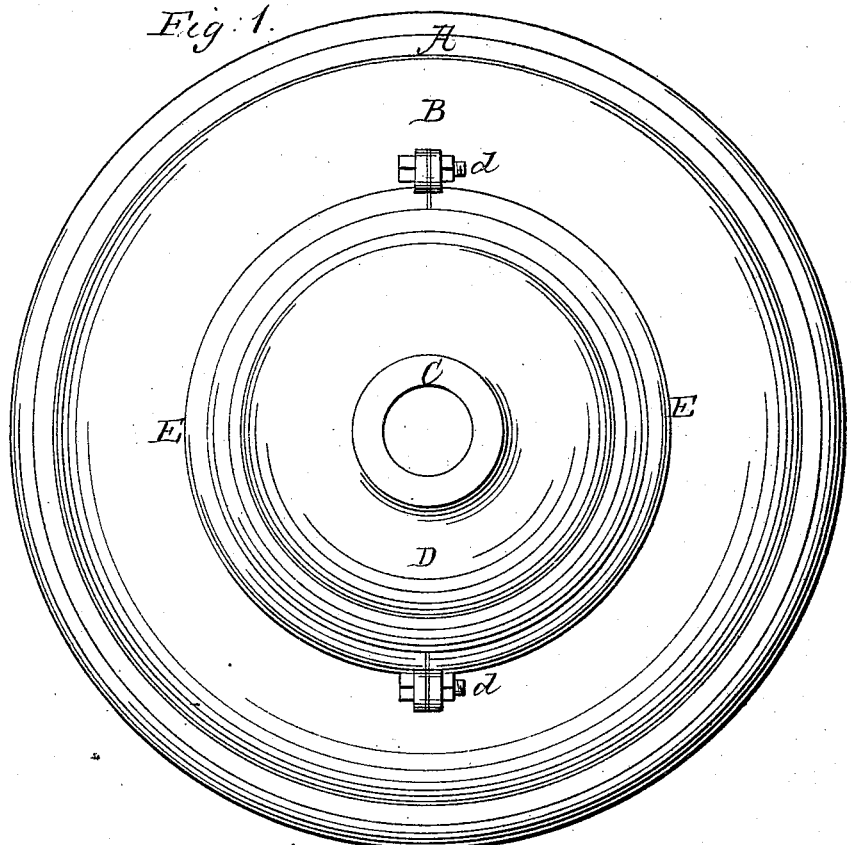
Figure 2:
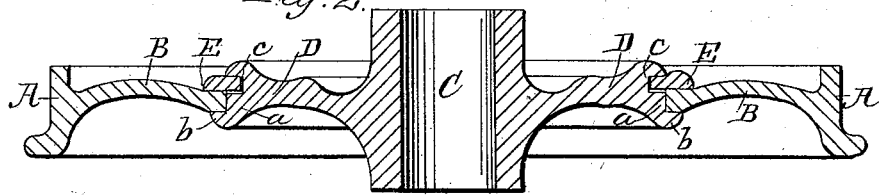
Figure 3:
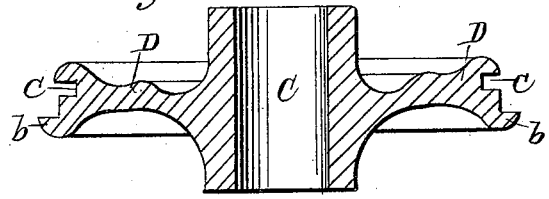

Figure 1, is a face view of a wheel constructed according to my invention. Fig. 2, is a central section of the same. Fig. 3, is a section of the central portion of the wheel detached.

Similar letters of reference indicate corresponding parts in both figures.

This invention relates to the construction of the wheel in two parts for the purposes of providing against cracking in cooling and of renewing the tread when worn out without removing the hub from the axle.

The invention consists in the peculiar method of fitting and securing the two parts of the wheel together.

To enable others skilled in the art to construct wheels according to my invention, I will describe it with reference to the drawing.

A, is the rim of the wheel which is cast with an interior concentric flange B.

C, is the hub which is cast with an exterior concentric flange D. The flange D, is of such size that a portion of it may fit within the interior flange B, of the rim, or be fitted therein by turning as shown at *a, a,* in Fig. 2, and its outer part is made so much thicker than the internal portion of the flange B, as to allow a shoulder *b,* to be left all around it to fit up to one side of the flange B, and to leave a sufficient portion protruding through on the opposite side of the flange B, to allow room for a groove *c,* which is formed all around it, and to allow a proper thickness of metal outside, to give proper strength to the groove which is to receive a clamping ring E, whose duty it is to secure the two parts of the wheel together. The groove *c,* is turned truly within the flange D, and is intended to be almost but not entirely outside of the flange B, just leaving a sufficient portion within the flange to allow the clamping ring E, to have a drawing action to draw the portion *a, a,* of the flange D, tightly up against the flange B. The groove *c* may be made rectangular, or with its outer side beveled, but the latter form is perhaps preferable. The transverse section of the clamping ring E, is of the form of a wedge, as shown in Fig. 2. The ring must be divided at one or more points or made in segments, in order to enable it to be inserted in the groove, and the divided portions or segments are connected by screw bolts *d, d,* which draw the parts into the groove *c,* and wedge the flange B, firmly up against the shoulder *b,* of the flange D, and thus connect the two flanges as firmly as if they formed a solid plate connection between the hub and rim.

What I claim as my invention, and desire to secure by Letters Patent, is—

Connecting the hub and rim of the wheel by fitting a flange D, attached to the hub, within a flange B, attached to the rim, providing the said flange D, with a shoulder *b,* and groove *c,* and applying a divided clamping ring E, to the said groove *c,* substantially as herein described.

A. C. KETCHUM.

Witnesses:
WM. TUSCH,
JAMES F. BUCKLEY.